United States Patent [19]
Porter et al.

[11] 3,936,976
[45] Feb. 10, 1976

[54] ANTI-EROSION COATING OF SEEDS

[75] Inventors: Frederic E. Porter, Minneapolis; Howard E. Kaerwer, Jr., Eden Prairie, both of Minn.

[73] Assignee: Northrup, King & Company, Minneapolis, Minn.

[22] Filed: Feb. 6, 1975

[21] Appl. No.: 547,633

Related U.S. Application Data

[63] Continuation-in-part of Ser. No. 322,013, Jan. 8, 1973, abandoned.

[52] U.S. Cl. .......................... 47/57.6; 111/1; 427/4; 427/202; 427/214
[51] Int. Cl.² ............................................ A01C 1/04
[58] Field of Search ............... 47/57.6, 58, DIG. 9; 117/3, 72, 100 C, 138.8 E

[56] References Cited

UNITED STATES PATENTS

| | | | |
|---|---|---|---|
| 2,502,809 | 4/1950 | Vogelsang | 47/58 |
| 2,579,732 | 12/1951 | Funsten et al. | 47/57.6 |
| 2,656,649 | 10/1953 | Ostier | 47/57.6 |
| 2,967,376 | 1/1961 | Scott | 47/57.6 |
| 3,707,807 | 1/1973 | Graves | 47/57.6 |
| 3,808,740 | 5/1974 | Porter et al. | 47/58 |

*Primary Examiner*—Robert E. Bagwill
*Attorney, Agent, or Firm*—Thomas M. Meshbesher

[57] ABSTRACT

In the disclosed method, grass seed or the like is coated with an inner "sticker" coating to which is adhered discrete particles of water-activatable adhesive. The resulting seed is resistant to movement by wind and water after sowing or planting.

10 Claims, 2 Drawing Figures

ANTI-EROSION COATING OF SEEDS

CROSS REFERENCE TO RELATED APPLICATIONS

This application is a continuation-in-part of our earlier filed application, Ser. No. 322,013, filed Jan. 8, 1973 (and now abandoned).

Our application, Ser. No. 321,679, filed Jan. 8, 1973, now U.S. Pat. No. 3,808,740, discloses methods of coating plant seeds and coated plant seeds obtained thereby.

FIELD OF THE INVENTION

This invention relates to coated seeds of gymnospermous and angiospermous plants and to a method of preparing such seeds for planting or sowing the seeds in or on loose seed beds or on surfaces that have been subjected to minimal preparation and on established lawns, roadside embankments, spoil banks, rangeland pastures, reclaimed cut-over forest lands, wood lots, established native pastures and even flower beds. After planting, the seed is resistant to movement caused by wind, flooding of the soil with water, or the like. An aspect of this invention relates to the application of a novel coating comprising an inner layer of adhesive binding an outer layer of coating comprising a water-activatable adhesive deployed as particulate matter. A further aspect of the invention relates to the sowing of processed seeds of angiospermous and/or gymnospermous plants on grassy, weedy, or bare soil and adherently bonding the seeds to the surface by moistening the surface and activating the particulate activatable adhesive. A further aspect of the invention relates to coated seeds suitable for this planting method, e.g. coated monocotyledonous seeds such as common grass seed.

DESCRIPTION OF THE PRIOR ART

There are a variety of seeds generically known as monocotyledonous seeds which produce grassy plants with slender leaves when sown on the surface of the soil. The common grasses grown on lawns and golf courses belong to this family of plants. Since this type of seed is light in weight and is sown or planted on the surface of the ground, it is very susceptible to erosion or movement caused by water and wind. It can be particularly difficult to sow a stable seed bed on a steep hill. The problem can be particularly acute on the fairways and greens of golf courses, where criteria for the evenness of the stand of grass are particularly high. Special problems of plant distribution are also encountered with seeding of spoil banks, roadside embankments, and native pastures which are not encountered in sowing cultivated fields.

Other types of seed, even angiospermous plant seed, can be subject to similar difficulties. Flaws resulting from error, from inability to put machinery on land, high costs of seed bed preparation or from other causes may expose seeds to special and unusual perils. Small seeds may be washed to excessive depths in a loose seed bed and may be unable to emerge during germination. Buoyant seeds may be floated in puddled soils or may be transported as a consequence of sheet erosion on relatively flat land.

Seeds may be lifted by mower action on turf seedings. The consequence of seed movement is that the desired patterns of seed disposition are altered. Seeds may be transported to undesirable locations that impede germination of seeds or survival of seedlings. Germinating seeds may be isolated from the soil as a consequence of movement. Combination of these influences render performance of seedings unsatisfactory with attendant economic or aesthetic losses. These problems all generally relate to reducing the tendency of sown seed to move from the original planting site, and are well known to those experienced in the planting of seeds.

The art of coating dicotyledonous or leguminous seeds is well developed. Examples of the prior art patent literature in this field include U.S. Pat. No. 2,967,376 (Scott), issued Jan. 10, 1961, and U.S. Pat. No. 3,621,612 (Porter), issued Nov. 23, 1971 and the patent references cited therein. The Scott patent, for example, contains a disclosure of the adherent materials or "sticker" used to cement on various additives to the seed including hygroscopic agents and parting agents such as silica which restore the seeds to a state of dry flowability. There is, however, little or no discussion in these references relating to coatings or other treatments for reduction of seed mobility after planting, or to the particular problems encountered with the more highly mobile seed such as grass seed.

SUMMARY OF THE INVENTION

Briefly, the present invention involves adhering discrete granules of a water-activatable adhesive, such as a polyoxyalkylene resin, to a "sticker" coating on seed subject to excessive seed movement after sowing or planting, e.g. grass seed. For the purposes of this invention, it is important that the "sticker" coat be tacky but sufficiently free of water to prevent the discrete granules or particles of water-activatable adhesive from softening to the point where they would lose their discrete particulate character. The resulting coated seed can be sown over existing grass or on bare ground and moistened (e.g. with a lawn sprinkler) until the particulate outer coating on the seeds is transformed into tiny, stiff masses of adherent material. Surprisingly, these tiny masses of water-activated adhesive apparently have the ability to, in some sense, cement the seeds to the soil. The resulting seed bed is resistant to movement caused by wind or water. Furthermore, germination of the seed in the seed bed does not appear to be adversely affected, and normal emergence of seedlings is generally observed.

BRIEF DESCRIPTION OF THE DRAWING

The invention can be more clearly understood with respect to the accompanying drawing, wherein.

DETAILED DESCRIPTION

As pointed out previously, this invention is suited for use with angiospermous and gymnospermous seeds and is particularly useful for providing anti-erosion treatments or coatings for monocotyledonous seeds such as any of the common grass seeds used on lawns, golf courses, etc. A significant characteristic of these common types of seed is the lack of any naturally occurring oily or waxy material on the surface of the seed. It has been found that conventional "stickers" such as the water soluble ethylene oxide polymers form a strongly adherent bond when coated onto the surfaces of grass seeds.

Materials Used in Coating

Figure 1:
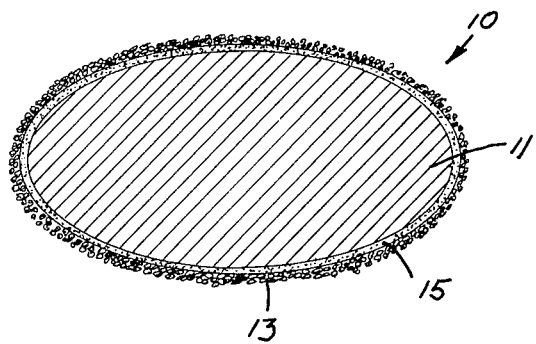
FIG. 1 is a cross sectional, greatly enlarged view of a seed coated according to the teachings of this invention.

The character of the coating on coated seeds of this invention can be more easily described with reference to the accompanying drawing. In FIG. 1, it can be seen that coated seed 10 comprises a grass seed 11, an inner "sticker" coat 15 and an outer layer 13 of particles bound to inner coating 15. The thickness of coating 15 and the size of the particles in layer 13 are greatly exaggerated for purposes of illustration.

The inner or "sticker" coating is firmly bonded to seed 11 and comprises one or more of the adherent materials described in the Scott and Porter patents cited previously. The principal requirement of the inner coating is that it should be coatable from a nonaqueous liquid carrier and/or it should be capable of being formed from a coating composition which dries to a substantially dry but tacky state. The term "substantially dry" or "substantially water free" is used to denote a condition wherein the amount of water in the tacky coating is not sufficient to obliterate the discrete particulate character of particles of water-activatable adhesive which come in contact with the coating.

A typical example of a suitable material for the inner coating 15 is the class of polymers derived from the polymerization of ethylene oxide, i.e. the solid, hydrophilic, high molecular weight polyoxyethylene resins. These resins typically have the formula:

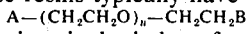
$$A-(CH_2CH_2O)_n-CH_2CH_2B$$

wherein $n$ is the index of polymerization and A and B are terminal groups such as hydroxy, alkoxy, and the like. The molecular weight of these ethylene oxide polymers can range from a few hundred up to about 5 million. The higher molecular weight polymers (molecular weights typically above a few thousand) are solids. Virtually all polymers containing a substantial proportion by weight of repeating oxyethylene units are hydrophilic and some are water soluble. Water solubility can range from a fraction of 1% up to infinite solubility. In the present invention, it is generally convenient to use a liquid coating composition containing the ethylene oxide polymer. Clear solutions of the polymer, rather than suspensions or dispersions, are preferred.

Solid ethylene oxide polymers which are soluble in water at a concentration greater than 0.1 weight percent (e.g. up to about 2 weight percent or more) are commercially available and can be used in this invention. An important characteristic of the aqueous solutions of these polymers is that, after evaporation of nearly all of the water, a substantially dry, tacky film can be formed by an appropriate coating technique. Apparently, the hydrophilic nature of the polymer takes up or retains enough water to remain tacky. These polymers are soluble in other solvents besides water, e.g. a variety of organic solvents. Since, to be economical, coating from organic solvent solutions would require a solvent recovery step, it is generally more convenient to use at least a major amount of water to dissolve the polymer. One manner of accomplishing this is to dissolve or suspend the polymer in a small amount of ethanol and dilute the resulting ethanolic medium with a major amount of water to provide a predominantly aqueous solution.

Another suitable material for the inner coating 15 is disclosed in Example I of Porter, U.S. Pat. No. 3,808,740, i.e., the adhesive "XA-2382" presently obtainable from the 3M Company, Adhesives, Coatings and Sealants Division, St. Paul, Minnesota.

The outer particulate layer 13 which is adhered to the inner ("sticker") coating 15 comprises discrete tiny granules or or particles of a water activatable adhesive. For example, the ethylene oxide polymers described previously are available in particulate form. The particles of adhesive tend to form an adherent, pituitous, viscoelastic mass when moistened with water.

One suitable commercially available form of these particulate poly(oxyethylene) materials is the class of polymers known as "POLYOX" (trade mark) water soluble resins, a product of Union Carbide Corporation, Chemicals and Plastics Development Division, New York, N.Y. "POLYOX" resins are granular nonionic poly(ethylene oxide) homopolymers ranging in molecular weight from over 100,000 to 5 million and above. They differ from other polyalkylene oxide analogs in being truly thermoplastic and completely soluble in water. The polymer chain structure of the "POLYOX" resins is believed to be largely linear. The hydrogen bonding which results when the repeating oxyethylene units come into contact with water is believed to be a major contributing factor to the unusual pseudoplasticity or viscoelasticity of the resulting viscous aqueous solution. The "POLYOX" granular powders are presently manufactured in 8 grades, i.e., 4 "WSR" grades and 4 "WSR N" grades. The WSR grades are preferred because they have extraordinarily high thickening power in aqueous media and greater pituitousness.

The WSR grades of "POLYOX" resin range in molecular weight from 200,000 (for WSR-35) to 4 million (for WSR-301). Excellent results can be obtained with WSR-105, which has a molecular weight of 600,000. The viscosity of a 5% solution of even the lower molecular weight WSR grades can range from 520 to 8000 centipoise at 25°C. Particle sizes for these materials are all 98% minus 10 mesh, and, as will be explained subsequently, −60 mesh particles are particularly suitable for use in this invention.

The chemical properties of the "POLYOX" resin (except for water sensitivity) are generally less important than the physical properties of moistened or dissolved "POLYOX", particularly pituitousness and pseudoplasticity or viscoelasticity. Thus any particulate water-sensitive adhesive with pituitousness and viscoelasticity or pseudoplasticity in the moistened state can be used in this invention as the outer particulate layer 13. The pituitousness creates a condition whereby the adhesive can be diluted with water to very low concentrations (e.g. 1%, 0.1%, or even about 0.05% by weight) without resulting in a total loss of adhesiveness. Moreover, this condition also assures that the adhesiveness will survive a series of wet/dry cycles. Under natural growing conditions, heavy rains may create a high water content in the seed environment, and rains frequently alternate with dry spells. Thus, adhesive particles which lack pituitousness in the moistened or dissolved state can be inoperative in the context of this invention if used as the sole adhesive in particulate outer layer 13.

"Pituitousness" is a term of art defined on page 12 of Union Carbide's 1968 pamphlet on "POLYOX Water Soluble Resins". In general, a pituitous material, in aqueous solution, will tend to form long strings or filaments as any immersed object is withdrawn from the solution. Pituitousness appears to vary exponentially with molecular weight and also appears to be related to the viscoelastic and pseudoplastic behavior of the water solutions. "Pseudoplasticity" is defined as a reversible reduction of viscosity with increasing shear rate which is believed to result from interaction of the dissolved adhesive molecules with water. Pseudoplasticity may be apparent in water solutions of "POLYOX" which contain less than 0.1% polymer. Pituitousness is also observed at low concentrations. For example, a wooden probe can be inserted in a 1.0 weight-% solution of "POLYOX" (WSR grade) and then withdrawn, and the result will be that a string or filament of solution will form that can be stretched to more than a centimeter in length (even several centimeters) before breaking.

Water activatable adhesives which lack pituitousness are not preferred for use in this invention, since the adhesiveness or tackiness provided by these materials can be lost, even permanently lost if an excess of water is present or if the adhesive goes through more than one or two wet/dry cycles. Hydrophobic materials (e.g. starch esters) are even less suitable, as are materials which are totally or substantially insoluble in water.

Thus, the practice of this invention runs generally contrary to the prior art practice relating to the addition of parting agents to mass of tacky or freshly coated seeds. In the prior art, the purpose of the parting agent is to reduce tack; hence, when the seeds are coated with a water-activatable adhesive, a parting agent is selected which is substantially insensitive to water. In the present invention, a water sensitive material is used for the outer coating on the seeds and, in a sense, serves as the parting agent. The parting-agent effect is obtained because, as explained previously, the mass of seeds provided with the inner or "sticker" coating is allowed to become substantially water-free before the water activatable adhesive particles are added to reduce the tackiness and adhere to the "sticker" coatings. Provided that the "sticker" coating is a material non-injurious to seeds, one can also use a non-aqueous "sticker" comprising a suitable adhesive dissolved in a suitable organic solvent which is also non-injurious to seeds. The organic solvent is of course, more expensive than water, and the non-aqueous systems are less preferred for that reason.

As is known in the art, pituitousness can be augmented or synergized with additives, e.g. lignin derivatives.

The particles of water-activatable adhesives should be very small in comparison to the size of the seed. Preferably, the particles should pass a 60 mesh (U.S. or Tyler) screen and be retained on a 325 mesh screen. Thus, a typical particle size distribution will be generally within the range of 10–250 microns. In the preferred practice of this invention, minus 80 plus 250 mesh particles or granules, wherein the majority of the particles are larger than 60 microns but smaller than 170 microns, are used.

As will be explained in more detail subsequently, outer layer 13 of a coated seed 10 of this invention tends to soften when moistened and form adherent masses 23 (FIG. 2) which appear to have the effect of actually cementing the seed to the soil.

The Coating Process

Batch processes of the type conventionally used to coat leguminous plant seeds can be used in this invention. For example, a mass of grass seed can be mixed with a solution of adhesive in a rotating drum. After the mass of seeds has been thoroughly blended with the adhesive and the solvent for the adhesive has evaporated off or been driven off, the seeds are in a substantially dry state but have been provided with tacky "sticker" coatings. The particulate or granular water-activatable adhesive can then be added to the seeds in a manner similar to the addition of a parting agent. The tacky seeds are then converted to a free flowing mass of seeds. Most of the seeds in the mass of seeds resemble coated seed 10 of FIG. 1 and have an inner coating 15 and an adherent outer layer 13 of the particulate water-activatable adhesive.

An adequate inner coating 15 can be provided by adding about 0.1–10 parts of adhesive solution per 100 parts by weight of seed. In the case of the ethylene oxide polymers, the adhesive solution typically contains about 0.5–2% by weight of ethylene oxide polymer dissolved in water and/or hot ethanol. Thus, the substantially dry, tacky inner coat remaining after evaporation of the solvent is extremely thin and typically comprises less than 0.1% of the weight of the dry seed. (Typically, 0.5–5 parts of solution are added to 100 parts by weight of dry seed.) It is preferred to use 1–2 weight percent of adhesive in the adhesive solution, thereby providing more than 0.005% by weight of the inner coat 15, based on the weight of the dry seed. Since grass seed is generally free of any naturally occurring outer waxy coating, good adherence of the ethylene oxide polymer to this type of seed can be obtained.

The amount of particulate water-activatable adhesive used to form outer layer 13 is generally about 0.1–10 parts per hundred, based on the weight of the dry seed. Good parting efficiency and good effectiveness as an anti-erosion coating can be obtained with, for example, about 0.5 parts per hundred (same basis).

Sowing of Coated Grass Seed

Figure 2:
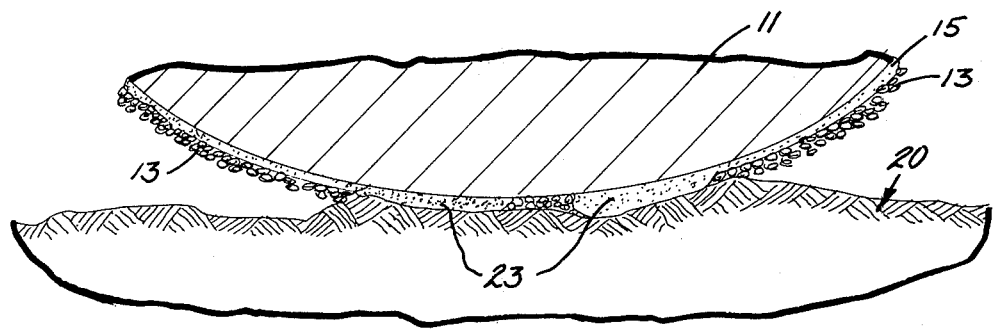
FIG. 2 is a fragmentary view, also in cross section but even more enlarged, of a coated seed sown according to the teachings of this invention.

FIG. 2 of the accompanying drawing shows the lower portion of a seed 11 coated according to this invention adherently disposed upon bare soil 20. The seed has been sown on the surface of the soil 20 in the conventional manner and then has become moistened, by environmental moisture or rain or by sprinkling with a spray of water droplets, e.g. from a hose or lawn sprinkler. Regions of outer layer 13 have become softened and have formed stiff masses 23 of water-activated adhesive. Surprisingly, these stiff masses 23 appear to glue or cement the seed to the soil 20 or otherwise reduce seed mobility, thus keeping the seed close to the planting site. This cementing effect apparently occurs despite the irregularities and the uncontrolled environmental conditions under which the seed is sown. It might be expected, for example, that uncontrolled constituents in the soil might render the adhesive masses 23 ineffective. However, when the soil is flooded, a significant decrease in erosion or seed movement is noted, even on seed beds with a steep pitch. As a result, the regulation of seed distribution in a sowing operation can be improved.

With normal care of seeds coated and sown according to this invention, normal germination and emergence of grass is generally also noted.

The following Example illustrates the principle and practice of this invention. All parts and percentages are by weight unless otherwise indicated.

EXAMPLE

Coated broccoli seeds were prepared according to the teachings of this invention. The procedure was as follows: 0.5 g of "sticker" were added to 50 g of broccoli seed. The "sticker" used in this Example was Adhesive XB-2390 available from the 3M Company, Adhesives, Coatings, and Sealants Division, St. Paul, Minnesota. This adhesive is described in essence in Example I of Porter, U.S. Pat. No. 3,808,740. The sticker and seed were mixed until each seed was covered. The mass was allowed to stand until it was substantially dry, but still somewhat sticky. "POLYOX" (WSR grade) was then added in the manner of a parting agent (approximately 1.0 gram) and the mass of seeds was mixed until the seeds were uniformly covered and free flowing.

For comparison with the prior art, an effort was made to duplicate Example E of Scott, U.S. Pat. No. 2,967,376, with presently available materials. Some substitutions were made for convenience. "Pyrotone Red" pigment was used in place of the wettable fungicide powder, since this pigment has particle size and wetting properties appropriate to the purposes of this comparison. Eagle-Pitcher "Celatom" was used in place of the "Hisil". "Celatom" is an infusorial earth characterized by small particle size and high silicate content. It is believed to resemble "Hisil" in its physical properties.

In preparing the coated seeds according to Scott, six 50-gram batches of broccoli seed were used. The procedure for coating each 50-gram batch was as follows: 0.26 g of the "Pyrotone Red" pigment and 0.5 g of a "sticker" were added to the 50 gram of seed. The pigment, seed, and sticker were mixed until each seed appeared to be covered with dust. Two milliliters of 3:1 mixture of glycerine/water was then added and the mass of seeds was mixed until each seed was covered. The mass was allowed to stand until it was dough-like in character. Then, 1.0 g of "Celatom" was added as a parting agent and mixed into the mass until the seeds were uniformly covered and free-flowing. The six-50 gram samples were cured overnight before testing. A different sticker was used for each 50-gram sample, as explained in the following table, wherein the samples are designated E-1 through E-6:

Table I

| Sample | Sticker Material |
|---|---|
| E-1 | Carboxymethyl cellulose (CMC) |
| E-2 | Hydroxyethyl cellulose (HEC) |
| E-3 | Methyl cellulose |
| E-4 | "POLYOX" WSR-204 |
| E-5 | Guar gum |
| E-6 | Gum Arabic |

An anti-erosion test was conducted in the following manner:

A line was drawn across each test surface (a rectangular greenhouse flat) near one end. Two grams of seed were distributed in a band along the line and then the flat was sprinkled with water so as to wet the surface without moving the seeds. At this time, the flat was level so seeds were not displaced. The wet flats were let stand for an hour to allow adhesion of the seeds to the surface. Each flat was then placed on a standard slope of approximately 40° up from horizontal. A gentle spray of water was used to create the erosion force. Erosion conditions were duplicated as precisely as possible for each flat. In addition to the six flats of Samples E-1 through E-6 and the flat for the seeds of this invention, an additional flat was set up and tested in the same way to determine the erosion effect on an untreated Control Sample. After the erosion had taken place, 5 inches further down the slope from the original band of seeds were marked off. The original band of seeds was the reference line (0.0 inches displacement) and the other five zones (for each flat) were as follows: 0.0 – 1.12 inch; 1.12 – 2.25 inches; 2.25 – 4.50 inches; 4.50 – 6.75 inches; and more than 6.75 inches. The seed bed surfaces in each flat comprised a material which was selected to resemble packed earth.

The results of counting and tabulating the seed distributions are given in Table II. These results indicate that 80% (numerically) of the coated seeds of this invention did not migrate from the reference or base line area. About 10% showed minor displacement, and only 3.7% were in the fifth zone. Samples E-1 through E-6, on the other hand, did not appear to perform significantly better than the Control sample in terms of movement under erosion stress. Apparently, a water-sensitive inner or sticker coating has no anti-erosion effect if it is inactivated with a water insensitive outer coating.

Table II

RESULTS OF ANTI-EROSION TEST
NUMERICAL % OF APPLIED SEED MOVED DISTANCES SHOWN

| SAMPLE: | 0 Inch | 1.12 Inch | 2.25 Inch | 4.50 Inch | 6.75 Inch | +6.75 Inch |
|---|---|---|---|---|---|---|
| E-1 (CMC) | 2.74 | 13.75 | 8.26 | 5.32 | 0.02 | 69.72 |
| E-2 (HEC) | 15.96 | 1.28 | 2.02 | 3.12 | 1.83 | 75.78 |
| E-3 (Methyl cellulose) | 10.28 | 5.87 | 5.13 | 11.55 | 4.40 | 62.75 |
| E-4 ("POLYOX") | 3.30 | 2.57 | 6.42 | 10.09 | 2.20 | 75.41 |
| E-5 (Guar Gum) | 17.98 | 0.09 | 2.20 | 3.49 | 2.20 | 73.58 |
| E-6 (Gum Arabic) | 2.94 | 14.13 | 4.59 | 3.12 | 0.04 | 74.86 |
| mean | 8.86 | 6.28 | 4.77 | 6.12 | 1.79 | 72.02 |
| THE INVENTION* | 80.55 | 10.46 | 3.49 | 2.39 | 0.00 | 3.67 |
| CONTROL (NO TREATMENT) | 6.78 | 2.94 | 8.07 | 5.50 | 2.75 | 73.90 |

*Prepared as described previously in this Example.

What is claimed is:

1. A process for preparing plant seeds for planting comprising the steps of:

a. coating the seeds with a substantially water-free tacky film which will not activate a water-activatable adhesive, b. contacting said tacky film with a dry, solid, particulate water-activatable adhesive which is not activated by said tacky film, said adhesive being capable of forming pseudoplastic, viscoelastic, pituitous water solutions in 1 weight percent concentration in water, at least 98% by weight of the particles of said adhesive being small enough to pass a 10 mesh screen; said contacting step being continued until (1) said seeds are covered with an adherent outer layer of discrete granules of said adhesive as the outermost layer of the coating on said seeds, and (2) said seeds are a dry, free flowing mass of discrete seeds.

2. A process according to claim 1 wherein said step (a) consists essentially of:
   a. coating said seeds with liquid coating composition comprising a liquid-activated film-forming material capable of forming a normally tacky, substantially dry film after liquid activation, said film-forming material being contained in a liquid carrier which activates said film-forming material and
   b. evaporating said liquid carrier until normally tacky, substantially dry films are formed on said seeds.

3. A process according to claim 2 wherein said liquid coating composition comprises:
   i. a water-activatable adhesive capable of dissolving in water,
   ii. a liquid carrier consisting essentially of water.

4. A process according to claim 3 comprising the steps of:
   a. dissolving in ethanol a water-activatable adhesive comprising an ethylene oxide polymer,
   b. diluting the resulting ethanolic solution with water to form a predominantly aqueous solution having an ethylene oxide polymer content of about 0.5–2% by weight,
   c. contacting a mass of seeds with 0.1–10 parts, per 100 parts by weight of said seeds, of said predominantly aqueous solution, until each of said seeds is coated with a layer of said predominantly aqueous solution,
   d. permitting the water and ethanol in said layer of predominantly aqueous solution to evaporate until said layer becomes substantially dry but still retains some tackiness,
   e. contacting said substantially dry but tacky layer with 0.1–10 parts by weight, per 100 parts by weight of said seed, of dry solid granules of water-activatable ethylene oxide polymer adhesive.

5. A process according to claim 1 wherein said dry, solid, particulate water-activatable adhesive used in said step (6) is an ethylene oxide polymer having a molecular weight greater than 200,000.

6. A process according to claim 1 wherein said plant seeds are the seeds of a monocotyledonous plant.

7. A process according to claim 1 wherein the pituitousness of said pituitous water solutions is augmented with lignin derivatives.

8. A coated plant seed, said plant seed being coated with:
   a. a substantially water-free inner sticker coating, bonded to said seed, the composition of said inner sticker coating being capable of being tacky in a substantially water-free state,
   b. adhered to said sticker coating as the outermost coating on said seed, a particulate coating comprising a dry, solid, particulate water-activatable adhesive which is not activated by said inner sticker coating when said inner sticker coating is substantially water-free and tacky, said water-activatable adhesive being capable of forming pseudoplastic, viscoelastic, pituitous water solutions in 1 weight per cent concentrations in water, at least 98% by weight of the particles of said adhesive being small enough to pass a 10 mesh screen.

9. A coated plant seed according to claim 8, wherein said water-activatable adhesive adhered to said inner sticker coating is an ethylene oxide polymer having a molecular weight greater than 200,000.

10. A method of planting comprising broadcasting the seeds of claim 8.

* * * * *